Oct. 7, 1941.    E. OYEN    2,258,066
PIPE JOINT
Filed March 11, 1940
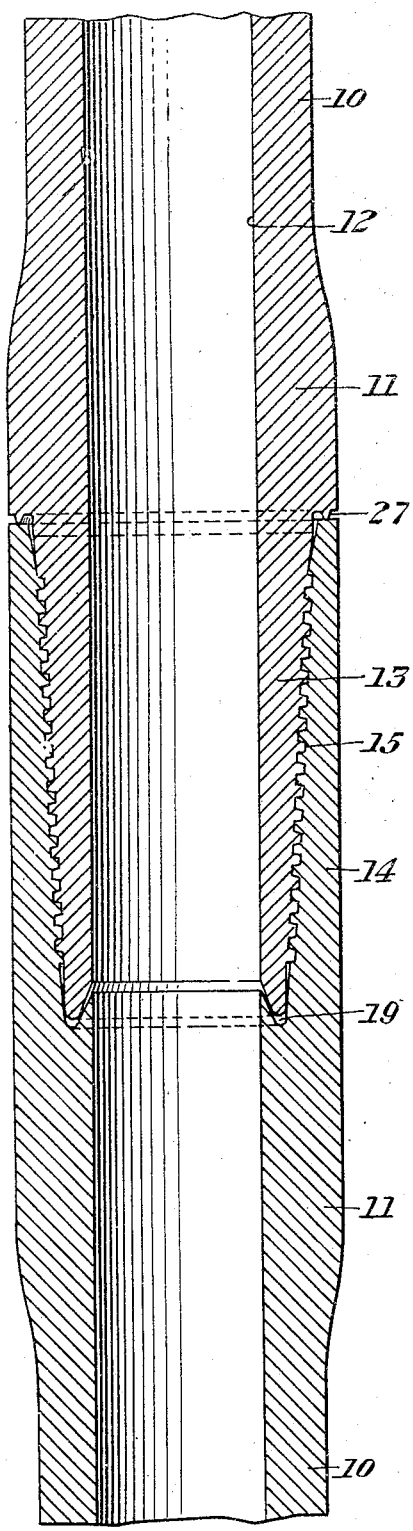
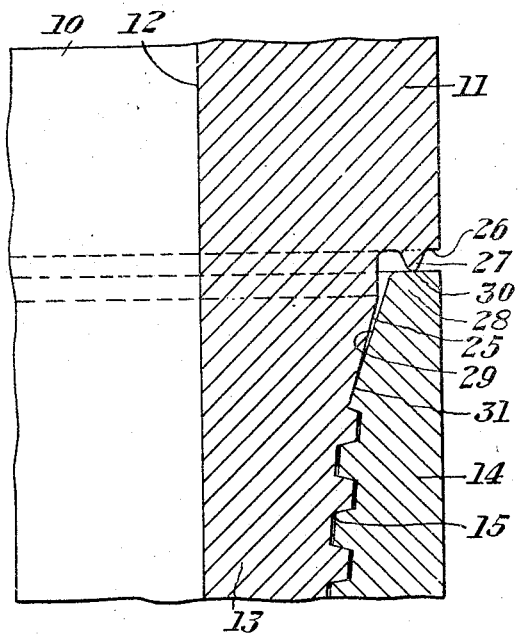
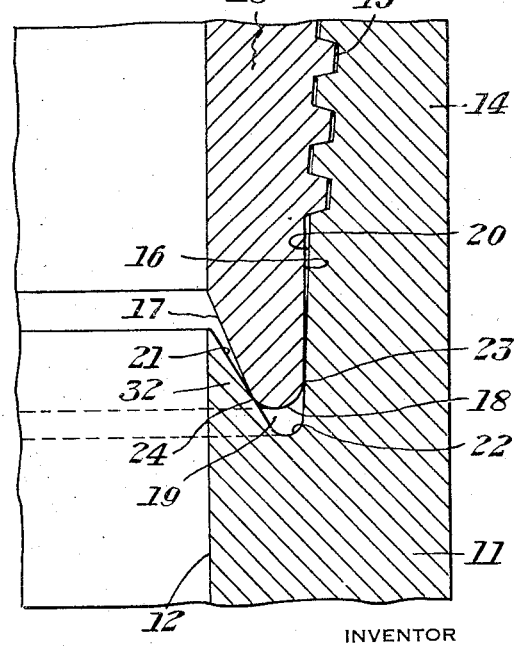
INVENTOR
Erling Oyen
by his attorneys
Stebbins, Blenko & Parmelee Patented Oct. 7, 1941

2,258,066

UNITED STATES PATENT OFFICE 2,258,066

PIPE JOINT

Erling Oyen, Youngstown, Ohio, assignor to The Youngstown Sheet and Tube Company, Youngstown, Ohio, a corporation of Ohio Application March 11, 1940, Serial No. 323,294

3 Claims. (Cl. 285—146)

This invention relates to a pipe joint and, in particular, to a joint suitable for connecting lengths of well casing, drill pipe or tubing, although it will be understood that the joint may be utilized in various other applications as well.

Numerous forms of pipe joints have been known heretofore and have served their intended purpose more or less satisfactorily. It is the object of this invention to improve generally upon known joints and to provide a joint which is fluid-tight, has greater strength in resistance to pulling out when made up, and can be made and broken more easily and quickly. Further objects are to provide a joint having a smaller outside diameter than joints requiring couplings and also to provide a joint sealed against fluid pressure by sealing surfaces of such character that they are protected from abrasion by particles suspended in the fluid flowing through the pipe.

In a preferred embodiment of the invention, a length of pipe of suitable wall thickness is upset externally at both ends and has a pin member formed at one end and a box member at the other, the pin member of one length being adapted to mate with the box member of an adjacent length disposed end to end therewith. The pin and box members are threaded externally and internally, respectively, and cooperating sealing surfaces on the two members provide a fluid-tight seal. The pin member has a shoulder with a bead thereon adapted to be engaged by the extremity of the box member when the joint is made up. The box member has a groove adapted to receive the extremity of the pin member and a lip overlying the latter when the joint is made up.

The following detailed description of the invention refers to the accompanying drawing illustrating the preferred embodiment briefly described above. In the drawing, Fig. 1 is a longitudinal section taken axially through a pipe joint embodying the invention; and Figs. 2 and 3 are sectional views showing portions of Fig. 1 to enlarged scale.

Casing pipe, drill pipe or tubing 10 is made in suitable lengths and of appropriate wall thickness and diameter. It is preferably, though not necessarily, upset externally at each end as at 11 and has a bore 12 therethrough. A pin member 13 is formed at one end of each length of pipe and a box member 14 at the other end. The exterior of the pin member and the interior of the box member are preferably tapered correspondingly and are threaded as at 15 throughout the greater portion of the tapered surface. The threads on the pin member and box member are preferably of the Acme type, as shown in the drawing, and are preferably multiple pitch, e. g., double pitch, whereby the joint can be made up and broken rapidly.

In a preferred manufacturing sequence, the joint is made by externally and internally upsetting the ends of the pipe and boring out the internal upset to the proper diameter, concentrically with the thread cut on the ends of the pipe. The joint can also be made by omitting the internal upset, in which case the bore will not be absolutely smooth and may not be entirely concentric with the outside diameter of the pipe. The joint can also be made as a flush joint without any upsetting of the pipe ends.

The extremity of the pin member 13 is defined by a substantially cylindrical surface 16, a conical surface 17 flaring toward the extremity and an annular nose 18, the section of which is a circular arc. The box member 14, adjacent the inner end of its tapered, threaded surface, is provided with an annular groove 19, the walls of which are defined by conical surfaces 20 and 21. As shown in the drawing, the surface 20 flares and the surface 21 converges toward the extremity of the box member. The section of the bottom of the groove is a circular arc 22 to which the sections through the surfaces 20 and 21 are tangent.

It will be clear from the foregoing that when the pin member 13 is screwed home in the box member 14, the rounded annulus or nose at the extremity of the pin member will have sealing engagement with the conical surfaces 20 and 21, at points 23 and 24, respectively.

Adjacent the inner end of its tapered, threaded section, the pin member 13 is provided with a conical surface 25 converging toward the extremity of the pin member. A shoulder 26 is formed on the pin member adjacent the surface 25 and is provided with an annular bead 27. The bead 27 is adapted to be engaged by the extremity of the box member indicated at 28 when the pin member is screwed home. The box member 14 also has a conical surface 29 flaring toward the extremity thereof which is similarly engaged by the surface 25 when the joint is made up. This provides seals at 30 and 31 in addition to the seals at 23 and 24.

It will be apparent from the foregoing description that the invention provides a novel form of pipe joint having numerous advantages over such joints as previously constructed. The joint has great strength in resistance to pulling out, because of the thickness of the mating pin and box members and the shape of the threads formed thereon. At the same time, the overall diameter of the joint is less than that of a joint including a coupling. The taper of the threaded surfaces facilitates "stabbing" and renders it easy to make and break the joint. This is expedited, furthermore, by the fact that the threads are of multiple pitch. If the ends of the pipe are upset externally, a uniform bore may be provided therethrough which permits fluid flow with practically no turbulence. The joint is rendered fluid-tight by a plurality of seals established by contacting surfaces of the pin and box members and these surfaces are protected from abrasion by particles suspended in fluid traversing the pipe. The box member has a lip 32 overlying the extremity of the pin member on which certain of the sealing surfaces are formed, which practically precludes any contact of the upwardly flowing particles with such surfaces. As a result, the sealing surfaces mate perfectly, even after the pipe has been in use for a long time.

The joint may be so designed that all the sealing surfaces on the pin and box members engage each other simultaneously. Alternatively, contact may be established first at points 30 and 31 and thereafter at points 23 and 24. It is not necessary, however, that the pin and box members be in actual contact at points 23 and 24 since their engagement at points 30 and 31 adequately seal the joint.

Although I have illustrated and described herein but a preferred embodiment of the invention, it will be recognized that changes therein may be made without departing from the spirit of the invention or the scope of the appended claims.

I claim:

1. A pipe joint comprising a pin member and a mating box member, said members having external and internal threaded surfaces, respectively, said box member having a groove at the inner end of its threaded surface, the walls of the groove converging inwardly of the box member, the extremity of said pin member being shaped to enter said groove and wedgingly engaging both of said walls when the joint is made up.

2. A pipe joint comprising a pin member and a mating box member, said members having external and internal threaded surfaces, respectively, said box member having a flaring groove at the inner end of its threaded surface, the extremity of said pin member having tapered sealing surfaces adapted to engage both walls of said groove and form a liquid-tight seal therewith when the joint is made up, and said pin member having a shoulder adjacent the inner end of its threaded surface adapted to be engaged by the extremity of said box member when the joint is made up.

3. A pipe joint comprising a pin member and a mating box member, said members having external and internal threaded surfaces, respectively, said box member having a groove at the inner end of the threaded surface, the walls of the groove converging inwardly of the box member, the extremity of said pin member being shaped to enter said groove and wedgingly engaging both of said walls, said pin member also having a shoulder adjacent the inner end of the threaded surface, and an annular tapered bead extending axially from said shoulder and adapted to be engaged by the extremity of the box member when the joint is made up.

ERLING OYEN.